United States Patent [19]

Laganis et al.

[11] 4,454,197

[45] Jun. 12, 1984

[54] ELECTRICAL CONDUCTOR COATED WITH A WATER-BORNE HERMETIC VARNISH

[75] Inventors: Deno Laganis, Schenectady; John Yodis, Amsterdam, both of N.Y.

[73] Assignee: Schenectady Chemicals, Inc., Schenectady, N.Y.

[21] Appl. No.: 516,256

[22] Filed: Jul. 22, 1983

Related U.S. Application Data

[62] Division of Ser. No. 311,387, Oct. 14, 1981, Pat. No. 4,433,080.

[51] Int. Cl.$^3$ ........................ B32B 15/00; B32B 25/00; H01B 7/00
[52] U.S. Cl. ................................... 428/379; 428/375; 174/110 E
[58] Field of Search ............................. 428/375, 379; 174/110 E, 120 SR, ; 523/414, 417, 424; 260/29.2 EP

[56] References Cited

U.S. PATENT DOCUMENTS

| | | | |
|---|---|---|---|
| 3,412,354 | 11/1968 | Sattler | 174/110 E |
| 3,878,146 | 4/1975 | Charlton | 174/23 C |
| 4,094,844 | 6/1978 | Allen et al. | 260/29.3 |
| 4,098,744 | 7/1978 | Allen et al. | 260/29.3 |
| 4,119,609 | 10/1978 | Allen et al. | 528/99 |
| 4,127,695 | 11/1978 | Hirakawa et al. | 174/110 E |
| 4,196,109 | 4/1980 | Laganis et al. | 428/458 |
| 4,237,149 | 12/1980 | Denk et al. | 174/110 E |
| 4,331,715 | 5/1982 | Wolpert | 523/200 X |
| 4,341,678 | 7/1982 | Georgalas et al. | 428/418 X |
| 4,356,277 | 10/1982 | Birkmeyer | 523/424 |

*Primary Examiner*—Lorraine T. Kendell
*Attorney, Agent, or Firm*—Cushman, Darby & Cushman

[57] ABSTRACT

A hydrolytically stable heat curable composition useful as a hermetic varnish for electrical conductors is provided. It consists essentially of an aqueous solution of (1) an epoxy adduct which is the reaction product of
(A) a glycidyl ether of a dihydric phenol,
(B) aminobenzoic acid,
(C) a water soluble organic solvent boiling about 150° C., and
(D) a water soluble amine,
and (2) a water soluble phenolic cross-linking agent.

14 Claims, No Drawings

ELECTRICAL CONDUCTOR COATED WITH A WATER-BORNE HERMETIC VARNISH

This is a division of application Ser. No. 311,387, filed Oct. 14, 1981, now U.S. Pat. No. 4,433,080.

BACKGROUND OF THE INVENTION

1. Field of the Invention

This invention relates to the coating of metal articles and to electrical equipment, e.g. made of copper, silver, or aluminum, such as coils, compressors, armatures, transformers, motors, and the like, with an aqueous solution of a water reducible epoxy resin that exhibits superior resistance to refrigerants, to chemical attack, and has excellent hot and cold bond strengths on helical coils.

2. The Prior Art

In the manufacture of electrical equipment for air conditioners and refrigerators where a refrigerant like Freon 22 is used, coils and their motor components are coated with a hermetic-type varnish. Varnishes of this type have a blend of an epoxy resin and a phenolic resin dissolved in a mixture of glycol ethers or esters and an aromatic hydrocarbon solvent. In the baking operation the evaporation of the aromatic hydrocarbon poses an air pollution problem.

One of the approaches to obviate this problem would be to formulate a water-borne coating which eliminates the use of aromatic hydrocarbons, and complies with EPA (Environmental Protection Agency) regulations.

Although aqueous systems having reactive carboxylic acid groups attached to epoxy esters have been proposed in the art, they have been deficient in resistance to refrigerants and bond strengths have been low. The products are hydrolytically unstable in the liquid and baked states. Emulsions of solid epoxy resins have posed rheological problems and their storage stability is only fair at best.

In Allen U.S. Pat. No. 4,094,844, Allen U.S. Pat. No. 4,098,744, Allen U.S. Pat. No. 4,119,609, and Birkmeyer German OS No. 2,809,403 (acknowledging U.S. application Ser. Nos. 775,489 and 775,490, filed Mar. 8, 1977), water-soluble coatings based on adducts of epoxy compounds with amino-substituted aromatic carboxylic acids are proposed as beverage can linings. These coatings, when applied to copper panels or coated copper wire, suffer from poor rheology and poor chemical resistance in a hermetic application. Moreover, their storage stability is less than two months when an aminoplast curative is present. The entire disclosure of the three Allen patents and the Birkmeyer German OS are hereby incorporated by reference and relied upon.

SUMMARY OF THE INVENTION

It has been found that novel, one-package epoxy-adduct coating compositions that are stable for over three months, have good rheology, low Freon 22 (monochlorodifluoromethane) extractibles and high bond strengths can be prepared.

This invention provides an improved epoxy coating composition comprising an epoxy adduct of a bisphenol A-epoxy resin reacted with an amino-substituted benzoic acid, and subsequently compounded with a glycol ether, an amine and a phenolic resin as a curative. These water-borne epoxy compositions provide clear baked films with excellent properties, especially suited as varnishes for hermetic motors and other electrical equipment. They can be used, for example, to coat enamelled wires made of copper, aluminum, or silver.

The compositions of the present invention differ from those of the Allen patents and the Birkmeyer German OS in one or more particulars, some of which are set forth below.

1. The compositions of the present invention involve a different type and critical range of phenoplast in the varnish composition.

2. The compositions of the present invention require different percentages and/or types of organic solvents (cosolvents) to achieve a smooth blister-free coating.

3. The chemical resistance requirements for a hermetic coating are different and more rigorous than for a can coating.

4. The method of application of the liquid varnish is different. Hermetic coatings require a dip-type coating rather than a roller coating as in can linings. Consequently the rheology is different.

The bisphenol A-epichlorohydrin resins can be the same as those of the Allen patents or the Birkmeyer German OS providing they meet the criteria set forth below.

Applicants have found that a water-miscible phenoplast comprised of a straight phenol-formaldehyde resin or a mixed phenol/bisphenol A-formaldehyde resin provides sufficient resistance to Freon 22 to provide a Freon extractible level below 0.25% as usually required by industry. Using a straight bisphenol A-formaldehyde resin confers an extractable level of less than 0.25% at a critical range of 22–60% phenolic resin on a solids basis of the total epoxy-phenolic solids, and gives the best appearance.

To get good wetting on a copper strip and over coated copper wire, as well as a smooth, blister-free baked film with a dip method, applicants have found that they cannot use alcohols or glycol ethers with lower boiling points than butyl Cellosolve (butoxyethanol) alone. Also the level of butyl Cellosolve can be about 40% (of the total cosolvent/water blend) or higher which exceeds the maximum amount of 30% in the Allen patents.

However, the organic solvent can be 30 to 90% or even 100% of the total of organic solvent and water. Usually, in the final composition, the organic solvent will not be over 60% of the total organic solvent and water.

DESCRIPTION OF THE PREFERRED EMBODIMENTS

The novel coating compositions of this invention comprise an aqueous solution of (1) a water-reducible, epoxy-adduct which is a reaction product of:

(A) an epoxy resin containing 1.3 to 2 epoxide groups per molecule which is a glycidyl polyether of 2,2-bis(4-hydroxyphenyl) propane, e.g. bisphenol A-epichlorohydrin resin, (B) an amino-substituted aromatic carboxylic acid, preferably para-aminobenzoic acid, (C) a glycol ether as a solvent, at least 10% of which is a glycol ether having a boiling point of at least 150° C., preferably butoxyethanol (butyl Cellosolve), wherein (A) and (B) are reacted in the presence of (C) as the solvent, the epoxy-adduct is made water soluble by the use of a tertiary alkyl amine, morpholine, or alkanolamine, or N-(2-hydroxyethyl) morpholine and this solution is compounded with (2) a water-soluble or water-reducible crosslinking agent. A preferred weight ratio of epoxy-adduct to crosslinking agent is from about 80/20 to 40/60.

This water-reducible coating is stable and cured by means of heat. It is especially suitable as a hermetic varnish or as a chemically-resistant coating.

EPOXY ADDUCTS

The epoxy resins utilized in the preparation of these particular coating compositions are polyfunctional glycidyl ethers containing more than one 1,2-epoxide group, and preferably 1.3 to 2 epoxide groups per molecule. Particularly preferred are the glycidyl ethers of "Bisphenol A" (4,4'-isopropylidene diphenol).

Other epoxy resins which can be used are glycidyl ethers of other dihydric phenols such as bisphenol-F, 4,4'-dihydroxybenzophenone, 1,1bis(4-hydroxyphenyl)-ethane, 1,1bis-(4-hydroxyphenyl)-isobutane, 2,2bis(4-hydroxyl-t-butylphenyl)-propane, bis(2-hydroxynaphthyl)methane and the like.

The epoxy resins that are used have an epoxy equivalent (grams of resin containing one gram equivalent of epoxide) of between about 170 and 2200; with preferred ones having an epoxy equivalent between 600 and 1200. One can start with commercially available solid epoxy resins, such as Epons 1002, 1004 (Shell), Araldite 6084 (Ciba-Geigy), or Epotuf 6304 (Reichhold), or with the diglycidyl ether of Bisphenol A and additional Bisphenol A to prepare in situ the desired epoxy resin having the previously specified preferred epoxy equivalent range.

Amino-substituted aromatic carboxylic acids employed in the preparation of the epoxy-adduct include the amino-substituted benzoic acids, such as ortho-, meta-, and para-aminobenzoic acids. The preferred acid is para-aminobenzoic acid.

The epoxy-adducts are prepared by reacting an epoxy resin with para-aminobenzoic acid, e.g. at 150° to 200° F. (about 66° to 92° C.) in the presence of a solvent, such as a glycol ether. The reaction involved under these conditions is to react the amine group with the epoxy group of the polyether, while leaving the carboxyl group free or unreacted. The aforementioned Allen patents and Birkmeyer German OS show the preparation of such adducts.

As to the stoichiometric amounts of reactants, they may range from about 0.60 to 0.10, even up to 1.50 moles of the amino acid per epoxide equivalent weight. For those condensates with less that 0.90 mole of amino acid per equivalent epoxy group, a higher percentage of cosolvent is required to maintain a clear, stable aqueous solution with or without a crosslinking agent. The preferred ratio is 0.85-1.25 mole of amino acid per equivalent epoxy group. It has been found that there is increased stability at the ratio of 1.25 compared to lower ratios.

PREPARATION OF EPOXY COATING

In general, the epoxy-adduct of condensate solution conveniently at approximately 75% solids in a glycol ether, is neutralized with a tertiary alkyl amine, morpholine, hydroxyethyl morpholine, or alkanolamine, e.g. at a temperature of 65°-70° C. (149°-158° F.) and held there for thirty minutes or so. Then, a crosslinking agent, i.e. a phenolic resin solution of the type defined, is added and mixed thoroughly. The final adjustment to the proper viscosity and solids is done by the addition of water alone or a combination of water and a cosolvent.

An alternate method is to premix the condensate solution with the crosslinker and cosolvent. Then this mixture is neutralized with an amine and held for thirty minutes or so at 65-70° C.

Water alone or water/cosolvent mixture is added in the required amount to reach the desired viscosity and solids for the aqueous coating.

AMINES

Tertiary alkylamines, morpholine, N-(2-hydroxyethyl)morpholine, or alkanolamines of the primary, secondary, or tertiary types may be utilized. Examples of primary alkanolamines are: 2-amino-2-methyl-1-propanol (AMP), 2-amino-2-methyl-1,3-propanediol (AMPD), 2-amino-2-ethyl-1,3-propanediol (AEPD), and ethanolamine.

Examples of secondary alkanolamines are: N-methyl ethanolamine and diethanolamine.

Examples of tertiary alkanolamines are: N,N-dimethylethanolamine (DMEA), 2-dimethylamino-2-methyl-1-propanol (DMAMP), N,N-diethylethanolamine (DEEA), and triethanolamine.

Examples of tertiary alkylamine are: triethylamine, tripropylamine. The trialkylamine should be water soluble.

The preferred amines are N,N-dimethylethanolamine (DMEA) and 2-dimethylamino-2-methyl-1-propanol (DMAMP) because of the enhanced storage stability they provide their varnishes over the other amines.

COSOLVENTS

In the electroinsulation area where a varnish is employed by a dipping process or the Zanderol (roll through) method to coat a coil or armature, e.g. of copper, the rheology of the system is different from the roller coat or spray operation whereby flat metal sheets or can ends or bodies are coated.

The type of metal substrate is also different in the electrical area as opposed to the beverage cans and other metal-decorating areas. In coating armatures or coils of enamelled copper wire the substrate, shape of article, immersion conditions, and dip tank stability requirements are vastly different than for beverage cans.

In screening various varnishes on bare copper strips or panels and on enamelled helical coils, the cosolvents employed with water are very important and critical in obtaining a smooth, continuous baked film that is devoid of pinholes, blisters, and craters.

Low-boiling cosolvents having a boiling point lower than about 150° C., such as methoxymethanol or ethoxyethanol, alone or in combination with alcohols, such as ethyl or isopropyl alcohol provide varnishes whose baked films exhibit pinholes and blisters.

Higher boiling cosolvents of 150° C. or greater provide smooth, continuous baked films. Blends of glycol ethers having boiling points above and below 150° C. may be utilized whereby the lower ones are present percentagewise not greater than about 35% and preferably not greater than 30%.

Suitable cosolvents are glycol ethers, diethers, glycol ether esters, and ketones. Examples of glycol ethers are: butoxyethanol, butoxypropanol, methoxydiethanol, ethoxydiethanol, butoxydiethanol, methoxydipropanol, ethoxydipropanol, and methoxytripropanol. Glycol ethers of 150° C. or less than may be blended with the higher boiling one are: methoxy ethanol, ethoxyethanol, methoxypropanol, ethoxypropanol, propoxyethanol, and propoxypropanol. Examples of a glycol ether acetate are: methoxy ethyl acetate, ethoxyethyl acetate, and ethoxydiethyl acetate (ethoxyethoxyethyl acetate). Examples of diethers are: dimethyl and diethyl ethers of diethylene glycol. Examples of a ketone or ketone alcohol are: diacetone alcohol, Pentoxone(4-methoxy-4-methyl-2-penetanone) and 4-methoxy-4-methyl-2-pentanol.

CROSSLINKING AGENTS

Suitable crosslinking agents or curatives are phenolic resins dissolved in water or in glycol ethers. Examples of these are: Bisphenol A/Formaldehyde resins, mixed Bisphenol A-phenol/Formaldehyde resins, Phenol/Formaldehyde resins, and Alkyl phenol-salicylic Acid-Bisphenol A/Formaldehyde resins. The preferred phenolic resin is of the Bisphenol A-Formaldehyde type.

The alkyl phenol-salicylic acid-bisphenol A-formaldehyde resins can be prepared as set forth in Laganis U.S. Pat. No. 4,196,109, e.g., Example 16. The entire disclosure of the Laganis patent is hereby incorporated by reference and relied upon. As the alkyl phenol there can be used for example, p-t-butyl phenol, p-t-octyl phenol, p-t-nonyl phenol, p-t-dodecyl phenol, o-t-butyl phenol, p-sec-butyl phenol, p-butyl phenol.

The coating compositions can contain other well-known adjuvants, such as surfactants for wetting, leveling, and flow control. The coating compositions as described are clear solutions, but they can be pigmented or dyed where so desired.

The water-reducible coatings can be applied to a variety of metal substrates, but for purpose of this invention are applied to copper strips or preferably previously coated copper wire wound into helical coils to test for cold and hot bond strengths. For the Freon 22 extractibles, aluminum wire of AWG-18 guage is coated with the varnish, baked, and the extracted resin weighed.

Baking to cure the coatings is satisfactorily carried out, e.g. at 163° C. (325°F.) for one hour per coat of 1 mil (dried film), Two coats are applied to the helical coils, as well as the aluminum wire for Freon 22 extractibles.

Unless otherwise indicated, all parts and percentages are by weight.

The compositions can comprise, consist essentially of, or consist of the stated materials and the process can comprise, consist essentially of, or consist of the stated materials.

EXAMPLE 1

Preparation of the Epoxy-Adduct Solution

A 5-liter flask equipped with a stirrer, nitrogen blanket, thermometer, condenser, and heating mantle was charged with 250 grams of butoxyethanol, 653 grams of a solid epoxy resin (glycidyl polyether of Bisphenol A having an epoxide equivalent weight of 850–1050 and an approximate molecular weight of 1400), and 97 grams of paraaminobenzoic acid. The flask's contents were heated to 82° C. (180° F.) and held at that temperature for eight to fourteen hours until a sample of the resin solution reduced to 50% solids in butoxyethanol reached a viscosity of Z-1. The batch was cooled to 25° C. (77° F.), and 87 grams butoxyethanol and 505 grams phenolic curing agent A were added. After the materials were thoroughly dispersed a tertiary amine, specifically DMAMP-80 (2-methylamino-2-methyl-1-propanol 80%) was added in an amount to provide ultimately a pH of 8.2. After a holding period of thirty minutes at 25° C., 2175 grams of a solvent blend of water/butoxyethanol (68/32) was added with rapid mixing.

This is the preferred method of preparing an aqueous epoxy varnish.

An alternate method is to take the epoxy-adduct solution at 75% solids in butoxyethanol as described above and at 65° C. (150° F.) add an additional 87 grams butoxyethanol and 505 grams phenolic curing agent. After they were thoroughly dispersed, a tertiary amine, such as DMAMP-80 or DMEA was added in an amount to provide ultimately a pH of 8.2. After a holding period of thirty minutes at 65° C. (150° F.), the contents were cooled to room temperature (25° C.), and 2175 grams of a solvent blend of water/butoxyethanol (68/32 by weight) was added with rapid mixing.

The physicals for the varnish were:

| Viscosity | S |
|---|---|
| % Solids | 33.5 |
| pH | 8.2 |

Epoxy-adducts with varying ratios of moles of p-aminobenzoic acid per epoxide equivalents weight have been prepared. They range from 0.65 mole p-aminobenzoic acid (PABA) to 1.5 mols PABA per epoxide equivalent. The preferred range is 0.85–1.25 moles PABA Per epoxide equivalent weight.

Preparation of Phenolic Curing Agent A—Example 1

The following materials were charged to a five-liter flask having three necks and equipped with a stirrer, thermometer and a condenser:

| Bisphenol A | 2000 grams |
|---|---|
| Formaldehyde (44% aqueous solution) | 1794 grams |
| Triethylamine | 100 grams |
| Methanol | 100 grams |
| Butoxyethanol | 500 grams |

The reaction mixture was held at 63°–67° C. for three and a half hours with agitation. The flask was set for vacuum reflux, and 25 inches of vacuum was applied. After one hour at 25 inches of vacuum, the free formaldehyde content of the refluxate was 3.3%. The flask was then set for vacuum distillation and distilled to 38° C. at 28 inches of vacuum.

The product was then cooled to room temperature, and it had the following physicals:

| % Solids | 80.2 |
|---|---|
| Viscosity | Z2-Z3 |
| Hot Plate Cure 160° C. | 105 seconds |
| Refractive Index | 1.5532 |
| Water Tolerance | 6 parts per 100 parts resin solution |
| Solvent Blend | 12.1% butoxyethanol 7.7% water |

In the case of a phenolic curative like curing agent A, the Bisphenol A/formaldehyde molar ratio is 1:3. It may range from 1:2 to 1:3.5 moles of BPA/HCHO; with the preferred range from 1:2.5 to 1:3.25 M BPA/HCHO.

Various other phenolic curing agents were prepared in a similar manner as described above, save for different starting phenolic compounds.

The are characterized chemically and designated as follows:

Phenolic Curing Agent B—aqueous phenol-formaldehyde resin solution

Phenolic Curing Agent C—aqueous mixed phenol-Bisphenol A/formaldehyde resin solution Phenolic Curing Agent D—aqueous alkylated phenol-salicyclic acid-Bisphenol A/formaldehyde resin solution—as in U.S. Pat. No. 4,196,109.

Preparation of Aqueous Epoxy Coatings

In general the aqueous epoxy coatings are comprised of:
(1) An epoxy-adduct resin solution
(2) A phenolic curing agent
(3) A tertiary amine-as an aqueous solubilizer
(4) Cosolvent
(5) Water The above materials may be admixed at room or ambient temmperature or at an elevated temperature of 26.7° to 65° C. (80°–150° F.); with the former method preferred.

The coating solids may range from 25 to 60% and the liquid varnish compositions may be diluted further with water only to 20% solids or less without effecting its clarity or performance. Its dilution with water can go as high as 10 parts water to one part varnish. The cosolvent level may range from 30 to 60% based on the total blend of cosolvent and water by weight in the coating. The phenolic curative may range from 10 to 60% of the total coating solids comprised of phenolic and epoxy resins; with the preferred range being 20 to 55%, more preferably not over 50%.

It has been found that the selection of a phenolic curing agent is of utmost importance in the baked film's performance. The amount of curative in the liquid coating's will affect the storage life as a one-package system. Curative levels of 50% and higher seriously diminish storage life. Phenolic curatives of various types were compounded into varnishes at a phenolic solids level of 35% of the total coating solids. Their compositions are shown in Table 1, and the results obtained with them in Table 2.

Another important criterion is to have a one-package system that is stable for over three months at room or ambient temperature. More stable varnishes have been found incorporating a phenolic curing agent, such as the previously described "A" type than an aminoplast which has a shorter package or storage stability, as well as less dip tank stability.

TABLE 1
Varnishes with Various Phenoplast Curing Agents

| | Examples | | | |
|---|---|---|---|---|
| | 2 | 3 | 4 | 5 |
| Varnish Components | | | | |
| Epoxy-adduct Resin Solution, Example 1 @75% NV in BE* | 685 | 698 | 685 | 500 |
| Phenolic Curing Agent A @75% NV in H₂O | 366 | — | — | — |
| Phennolic Curing Agent B, @ 65% NV in H₂O | — | 434 | — | — |
| Phenolic Curing Agent C, @74.6% NV in H₂O | — | — | 371 | — |
| Phenolic Curing Agent D, @ 70% NV in BE/H₂O (75.5/24.5) | — | — | — | 288 |
| Butoxyethanol (BE) | 551.25 | 470 | 461 | 221 |
| DMAMPΔ (@80% Strength in H₂O) | 59.50 | 61 | 60 | 44 |
| Water (H₂O) | 913.75 | 815 | 855 | 596 |
| Varnish Physicals | | | | |
| Appearance | clear | clear | clear | clear |
| Viscosity (Gardner-Holdt Scale) | J | I ½ | R ¾ | W |
| Specific Gravity @25° C. | 1.049 | — | — | — |
| pH | 8.2 | 7.8 | 7.8 | 7.6 |
| % Solids, calc'd. | 30.7 | 32.5 | 32.5 | 35 |
| Solvent Blend | | | | |
| H₂O/BE, by wt. | 58.4/41.6 | 60.3/39.7 | 60.3/39.7 | 60.35/39. |
| % Phenolic Solids | 35 | 35 | 35 | 35 |

*BE: Butoxyethanol
ΔDMAMP: 2-Dimethylamino-2-methyl-1-propanol

TABLE 2
Effect of Phenoplast Type on Varnish Film Properties

| | Examples | | | |
|---|---|---|---|---|
| | 2 | 3 | 4 | 5 |
| Bond Strengths, ASTM D-2519 On Amide-Imide/ ISONEL ® 200 Helical Coils. | | | | |
| @ 25° C., lbs. | 63.1 | 35.1 | 53.8 | 40.4 |
| @ 150° C., lbs. | 22.7 | 24.7 | 27.4 | 7.3 |
| Refrigerant Resistance Freon 22 Extractibles, % | 0.135 | 0.226 | 0.235 | 0.520 |
| Baked Film Appearance | Smooth | Blistered | Blistered Badly | Blistered Badly |
| Curing Agent | | | | |
| % | 35 | 35 | 35 | 35 |
| Type | A | B | C | D |

In evaluating a coating of this type as a hermetic varnish, the important criteria are bond strengths and percentage Freon 22 extractibles in determining its refrigerant resistance. Bond strength minimum values have been set at 30 pounds at 25° C. and 10 lbs, at 150° C. for a two-mil baked varnish film (applied in two coats of one-mil per coat) over a helical coil of AWG-18H copper wire previously enamelled with an amide-imide/ISONEL 200 Polyester. The maximum Freon 22 extractibles have been set at 0.25%.

Of the varnishes 2–5, except for example 5 with phenolic curing agent D, all were below the maximum value of 0.25% for Freon 22 extractibles. The varnish with curing agent D can be used, however, where high resistance to Freon 22 is not absolutely essential. Again their cold and hot bond strengths far exceeded the minimum values previously cited, except for a low hot bond strength value of 7.3 lbs., for example, example 5 with phenolic curing agent D. Finally, the one critical test that any varnish must pass is that it be a smooth, continuous film after being baked. The varnish shown in example 2 with phenolic curing agent was the only varnish to pass this test using the coating conditions described as shown in Table 2. Blistering can be eliminated with the other varnishes by utilizing thinner coats with repeated application. This, of course, means longer times for preparing the coated wire are required.

Thus, the phenolic curing agent A is the preferred curative. On this basis, it was chosen as the phenoplast for compounding a series of aqueous epoxy varnishes wherein its resin solids were ranged from 10 to 60% of the total coating solids. These varnishes are shown in Table 3 and these test data in Table 4.

yethanol/ethanol provided baked films with pinholes, blisters, and generally non-smooth appearance.

Glycol ethers having boiling points greater than about 150° C. provided greatly improved baked film appearances. Blends of glycol ethers above and below 150° C. may be utilized whereby the lower boiling ones are percentagewise not greater than about 35%.

Methoxy ethyl acetate (acetate ester of methoxyethanol) provides an aqueous epoxy varnish that requires a

TABLE 3

Varnishes With Varying Content of Phenoplast Curing Agent A

| | Example | | | | | | |
|---|---|---|---|---|---|---|---|
| | 6 | 7 | 8 | 9 | 10 | 11 | 12 |
| Varnish Components, grams | | | | | | | |
| Epoxy-Adduct Resin Solutions, Example 1 @ 75% NV in BE* | 360 | 396.7 | 360 | 360 | 243.6 | 210 | 186.7 |
| Phenolic Curing Agent A, @ 80.2% NV in BE/H$_2$O (61.1/38.9) | 37.4 | 65.5 | — | — | — | — | 261.8 |
| Phenolin Curing Agent A, @ 80.6%/NV in BE*/H$_2$O (61.3/38.7) | — | — | — | — | 164.1 | 195.4 | — |
| Phenolic Curing Agent A, @ 75% NV in H$_2$O | — | — | 103 | 193.6 | — | — | — |
| Butoxyethanol (BE) | 175.5 | 179.4 | 290.3 | 178 | 145.1 | 151 | 221.4 |
| DMAMP$^\Delta$ @ 80% Strength in H$_2$O | 31.1 | 34.3 | 32 | 31.3 | 21.2 | 18.3 | 16.1 |
| Water (H$_2$O) | 396 | 417.85 | 547 | 353.8 | 326 | 325.3 | 359 |
| Varnish Physicals | | | | | | | |
| Appearance | clear | clear | clear | clear | clear | clear | clear |
| Viscosity (Gardner-Holdt Scale) | V ¼ | X+ | J ½ | K | U ½ | Q | C |
| pH | 7.9 | 7.8 | 7.9 | 7.9 | 7.9 | 7.8 | 8.15 |
| % Solids, Calcd. | 30 | 32 | 26 | 30.5 | 35 | 35 | 33.5 |
| Solvent Blend | | | | | | | |
| H$_2$O/BE by wt. | 60/40 | 60/40 | 60.1/39.9 | 60/40 | 59.5/40.5 | 60.3/39.7 | 56/44 |
| % Phenolic Solids | 10 | 15 | 22 | 35 | 42 | 50 | 60 |

*BE-Butoxyethanol
$^\Delta$DMAMP-2-Dimethylamino-2-methyl-1-propanol

TABLE 4

Effect of Phenoplast Content on Varnish Film Properties

| | Examples | | | | | | |
|---|---|---|---|---|---|---|---|
| | 6 | 7 | 8 | 9 | 10 | 11 | 12 |
| Varnish Number | | | | | | | |
| Bond Strengths, | | | | | | | |
| ASTM-2519 on Amide-Imide/ISONEL ® 200 Helical Coils | | | | | | | |
| @ 25° C., lbs. | 25.7 | 40.9 | 51.4 | 63.1 | 64.3 | 61.9 | 49.2 |
| @ 150° C., lbs. | 2.6 | 6.2 | 13.7 | 22.7 | 23.8 | 32.4 | 42.3 |
| Refrigerant Resistance | | | | | | | |
| Freon 22 Extractibles, % | 0.390 | 0.356 | 0.209 | 0.135 | 0.114 | 0.174 | 0.242 |
| Baked Film Appearance | smooth | smooth | smooth | smooth | smooth | smooth | smooth |
| Curing Agent | | | | | | | |
| % | 10 | 15 | 22 | 35 | 42 | 50 | 60 |
| Type | A | A | A | A | A | A | A |

The amide-imide is the reaction product of trimellitic anhydride and methylenedianiline.
Isonel 200 is a polyester of tris(2-hydroxyethyl) isocyanurate, ethylene glycol, and terephthalic acid.

Varnishes having 22 to 60% phenolic curing agent A all passed the maximum allowable Freon 22 extractibles; pointing to the preferred range of phenolic resin solids in the varnish as 20 to 60%.

Effect of Cosolvent Type on Baked Film Appearance

Various glycol ethers were tried in aqueous epoxy varnishes with mixed results as to baked film appearance. Ethoxyethanol alone or in admixture with an alcohol, such as ethanol, at a weight ratio of 2:1 ethoxhigher level of cosolvent than the glycol ethers, namely above 40%.

Effect of Higher Epoxide Equivalent Epoxy Resins on Aqueous Solubility

Mixtures of epoxy resins having epoxide equivalent weights of 870–1025 and 1550–2000 and the latter alone, were tried with varying amounts of PABA. Adducts containing 1:1 weight ratio of each epoxy resin and PABA mole ratios of 1:1 and 2.55:1 had very limited water solubility even at a cosolvent level of 75% for the former and 38% for the latter as their adduct solutions turned cloudy.

Adduct aqueous solutions of an epoxy with an epoxide equivalent weight of 1550–2000 and PABA mole ratios of 1:1 and 2.55:1 turned cloudy even with cosolvent levels of 93 and 38%, respectively.

EXAMPLE 13

Phenolic Intermediate E

To a 5-liter flask set for atmospheric reflux was added 2000 grams of bisphenol A, 1794 grams of aqueous 44 percent formaldehyde, 100 grams of triethylamine and 100 grams of methanol.

The reaction mixture was held at 63°–67° C. for 3½ hours with agitation. The flask was then set for vacuum reflux, and 25 inches of vacuum were applied to the reaction mixture. After one hour at 50° C. and 25 inches vacuum, the free formaldehyde of the refluxate was 3.3 percent.

The flask was then set for vacuum distillation and distilled to 38° C. at 28 inches vacuum.

The product was then cooled to room temperature and stored at 10° C.

| Final Physicals | |
|---|---|
| Yield | 3441 grams |
| % NV | 75.9 (2g., 1 hr. at 275° F., F.A. |
| Water Tolerance | 6/100 |
| Refractive Index | 1.5532 |
| Viscosity | Z2-Z3 |
| Cure at 160° C. | 105 sec. |

EXAMPLE 14

Aqueous Epoxy Hermetic Varnish 3265 g Epon 1004 and 1250 g Butyl Cellosolve were added to a 12-liter flask set for atmospheric reflux. These were heated to 82° C. with agitation and held for a homogeneous solution. At this point 485 g p-aminobenzoic acid were added and the solution maintained at 82° C. with agitation for approximately eleven hours. The end point of this reaction was considered to be when the viscosity leveled off, in this case a 40% checkout in Butyl Cellosolve was viscosity S-T with an acid number of 53 at 100% N.V. (non-volatile). The batch was then cooled to 66° C.

2689 g of phenolic intermediate E was premixed with 435 g Butyl Cellosolve. This mixture was then added to the epoxy solution above at 66° C. The premixing step is necessary to prevent a temporary clouding of the system which occurs when the straight phenolic intermediate is added.

After approximately fifteen minutes of mixing to achieve homogeneity, 435 g of DMAMP (80%) (N,N-dimethyl-2-amino-2-methyl-1-propanol) was added and the system held for thirty minutes with no additional heat input. A peak exotherm of 69° C. was observed. After the thirty minute hold, 2924 g of Butyl Cellosolve was added and the batch allowed to cool to room temperature. 6275 g of water was added at room temperature to give a clear orange solution.

| % N.V. | 33.5 (1 ½ g 1 hr. at 150° C.) |
|---|---|
| pH | 8.2 |
| Viscosity | S |

EXAMPLE 15

Preferred Epoxy-Adduct Composition

In a manner similar to that in Example 1, a solution of 871 grams of a solid epoxy resin (glycidyl polyether of bisphenol A having an epoxide equivalent weight of 871 and an approximate molecular weight of 1400) in 347 grams of butoxyethanol was reacted with 171 grams of p-aminobenzoic acid. The reaction required ten hours at 82° C. to achieve a viscosity of U at 40% solids in butoxyethanol. This reaction product was reduced further with 337 grams of butoxyethanol. 379.2 grams of this solution was then blended with 78.6 grams of butoxyethanol, 152.7 grams of phenolic curing agent A and 35.0 grams of DMAMP-80 (2-methyl-amino-2-methyl-1-propanol 80%). The mixture was stirred to give a homogeneous solution, thereafter 354.5 grams of water was added.

The physicals for the resultant varnish were:

| Viscosity | S+ |
|---|---|
| % Solids | 35.0 |
| pH | 8.1 |

What is claimed is:

1. An electrical conductor coated with the product obtained by curing on the conductor hydrolytically stable, heat-curable hermetic varnish which consists essentially of an aqueous solution of (1) a water-reducible, epoxy adduct, which is a reaction product of
   (A) an epoxy resin which is a glycidyl ether of a dihydric phenol containing 1.3 to 2 epoxide groups per molecule, and having an epoxy equivalent of about 600 to 1200
   (B) aminobenzoic acid in an amount of 0.60 to 1.50 moles per epoxide equivalent weight,
   (C) a water-soluble organic solvent having a boiling point above 150° C. which is a glycol ether, a glycol ether carboxylic acid ester, an unsubstituted ketone or a ketone alcohol or a blend of such a solvent with (1) up to 35% of a glycol ether, (2), up to 35% of an alkanol boiling below 150° C. or (3) up to 35% of a glycol ether and an alkanol boiling below 150° C.
   (D) sufficient quantity of a water soluble amine which is a tertiary alkyl amine, morpholine, N-(2-hydroxyethyl) morpholine or an alkanolamine to render the epoxy adduct soluble in water, (2) a water soluble or water reducible phenolic crosslinking agent which is a 2,2-bis(4-hydroxyphenyl) propaneformaldehyde resin, having a 2,2-bis(4-hydroxyphenyl)propane to formaldehyde ratio of 1:20 to 1:3.5 on a molar basis, the phenolic crosslinking agent being 10 to 60% of the total of the phenolic and epoxy resin coating solids, the coating solids being not over 60% of the aqueous solution, the organic solvent being 30 to 90% of the total of organic solvent and water.

2. An electrical conductor according to claim 1 in the form of a copper coil.

3. An electrical conductor according to claim 1 in wire form.

4. An electrical conductor according to claim 3 wherein the aminobenzoic acid is present in an amount of about 1.25 moles per epoxide equivalent weight.

5. An electrical conductor according to claim 3 wherein the aminobenzoic acid is present in amount of about 1.25 moles per epoxide equivalent weight.

6. An electrical conductor according to claim 3 wherein the epoxy resin is a glycidyl ether of 2,2-bis(4-hydroxyphenyl)propane.

7. An electrical conductor according to claim 6 wherein the aminobenzoic acid is paraaminobenzoic acid.

8. An electrical conductor according to claim 7 wherein the organic solvent is butoxyethanol, butoxypropanol, methoxydiethanol, ethoxydiethanol, butoxydiethanol, methoxydipropanol, ethoxypropanol, methoxytripropanol, methoxy ethyl acetate, ethoxyethyl acetate, ethoxyethoxy ethyl acetate, dimethyl ether of diethylene glycol, diethyl ether of diethylene glycol, diacetone alcohol, 4-methoxy-4-methyl-2-pentanone, 4-methoxy-4-methyl-2-pentanol, or a blend of such solvent with up to 35% of a solvent boiling up to 150° C. which is methoxy ethanol, ethoxyethanol, methoxypropanol, ethoxypropanol, propoxypropanol, or propoxyethanol.

9. An electrical conductor according to claim 7 wherein the cross-linking agent is about 20 to 50% of the total of phenolic and epoxy resin coating solids.

10. An electrical conductor according to claim 9 wherein the cross-linking agent is about 20 to 35% of the total of phenolic and epoxy resin coating solids.

11. An electrical conductor according to claim 10 wherein the water-soluble amine is an alkanolamine.

12. An electrical conductor according to claim 11 wherein the alkanolamine is 2-dimethylamino-2-methyl-1-propanol.

13. An electrical conductor according to claim 10 wherein the molar ratio of 2,2-bis(4-hydroxyphenyl)propane to formaldehyde in the cross-linking agent is from 2.5 to 3.25.

14. An electrical conductor in wire form coated with the product obtained by curing on the conductor hydrolytically stable, heat curable hermetic varnish which consists essentially of a solution of (1) a water-reducible, epoxy adduct which is a reaction product of (A) an epoxy resin which is a gycidyl ether of a dihydric phenol containing 1.3 to 2 epoxide groups per molecule, and having an epoxy equivalent of about 600 to 1200

(B) aminobenzoic acid in an amount of 0.60 to 1.50 moles per epoxide equivalent weight, (C) a water-soluble organic solvent having a boiling point above 150° C. which is a glycol ether, a glycol ether carboxylic acid ester, an unsubstituted ketone or a ketone alcohol or a blend of such a solvent (1) up to 35% of a glycol ether, (2), up to 35% of an alkanol boiling below 150° C. or (3) up to 35% of a glycol ether and an alkanol boiling below 150° C.

(D) sufficient quantity of a water soluble amine which is a tertiary alkyl amine, morpholine, N-(2-hydroxyethyl) morpholine or an alkanolamine to render the epoxy adduct soluble in water, (2) a water soluble or water reducible phenolic cross-linking agent which is a 2,2-bis(4-hydroxyphenol) propaneformaldehyde resin having a 2,2-bis(4-hydroxyphenyl)propane to formaldehyde ratio of 1:20 to 1:3.5 on a molar basis the phenolic cross-linking agent being 10 to 60% of the total of the phenolic and epoxy resin coating solids, the coating solids being not over 60% of the solution.

* * * * *